United States Patent
Erikson

(10) Patent No.: US 6,707,761 B2
(45) Date of Patent: Mar. 16, 2004

(54) CO-REGISTERED ACOUSTICAL AND OPTICAL CAMERAS FOR UNDERWATER IMAGING

(75) Inventor: Kenneth R. Erikson, Henniker, NH (US)

(73) Assignee: BAE Systems Information & Electronic Systems Integration INC, Nashua, NH (US)

( * ) Notice: Subject to any disclaimer, the term of this patent is extended or adjusted under 35 U.S.C. 154(b) by 106 days.

(21) Appl. No.: 10/246,088

(22) Filed: Sep. 17, 2002

(65) Prior Publication Data

US 2003/0058738 A1 Mar. 27, 2003

Related U.S. Application Data

(60) Provisional application No. 60/322,725, filed on Sep. 17, 2001.

(51) Int. Cl.[7] .......................... G01S 15/89; H04B 11/00
(52) U.S. Cl. ........................ 367/131; 396/25; 348/81
(58) Field of Search .................... 367/131; 396/25; 348/81

(56) References Cited

U.S. PATENT DOCUMENTS

| | | | | |
|---|---|---|---|---|
| 4,105,990 A | * | 8/1978 | Rines et al. | 367/96 |
| 4,335,944 A | * | 6/1982 | Marshall | 396/28 |
| 4,381,144 A | * | 4/1983 | Breslau | 396/27 |
| 4,447,896 A | * | 5/1984 | Rines | 367/96 |
| 4,713,798 A | * | 12/1987 | Kay | 367/96 |
| 4,922,467 A | | 5/1990 | Caulfield | |
| 4,991,149 A | | 2/1991 | Maccabee | |
| 5,357,063 A | | 10/1994 | House et al. | |
| H001409 H | * | 1/1995 | Bixler | 701/223 |
| 5,598,152 A | | 1/1997 | Scarzello et al. | |
| 5,682,229 A | * | 10/1997 | Wangler | 356/4.01 |

OTHER PUBLICATIONS

Fusiello et al., "Calibration of an Optical–Acoustic Sensor," Machine Graphics adn Vision, vol. 9, No. 1/2, 2000, pp. 207–214.*
Lagstad et al., "Real time sensor fusion for autonomous underwater Imaging 3D" OCEANS '96. MTS/IEEE. 'Prospects for the 21st Century'. Conference Proceedings, Sep. 23, 1996, Ft. Lauderdale, FL, USA, pp. 1330–1335, vol. 3.*
Singh et al., "Advances in Fusion of High Resolution Underwater Optical and Acoustic Data," Underwater Technology, 2000. UT 00. Proceeding of the 2000 International Sympsoium on., Tokyo, Japan May 2000, pp. 206–211.*
Sabatier, James M. et al, "Laser–Doppler Based Acoustic–to–Seismic Detection of Buried Mines", SPIE Conference on Detection and Remediation Technologies for Mines and Minelike Targets IV, SPIE, vol. 3710, pp. 215–222,1999.
Simpson, Harry J. et al, "Synthetic array measurements of acoustical waves propagating into a water–saturated sandy bottom for a smoothed and roughened interface", J. Acoust. Soc. Am. 107(5), Pt.1, May 2000, pp. 2329–2337.
Malmberg, Roy Dale, "A Study of the Feasibility of Using a Buried Sonar Transducer to Echo–Locate Objects Buried in Sediment", Naval PostGraduate School, Monterey, CA, Sep. 1987.

(List continued on next page.)

Primary Examiner—Ian J. Lobo
(74) Attorney, Agent, or Firm—Maine & Asmus

(57) ABSTRACT

A real-time, three dimensional, acoustical camera and a real-time, range-gated, intensified, electro-optical camera have substantially overlapping fields of view for co-registered imaging of underwater objects at close ranges. The system is typically mounted in an unmanned underwater vehicle but may be used in other fixed or mobile configurations. The coupled fields of view are steerable in an arc around at least one axis over a large field of regard with a servo-controlled rotating mirror system, while the vehicle or the target is moving or hovering. An automated target recognition system uses the multi-modality images to provide enhanced target recognition and/or autonomous operation in unmanned missions.

25 Claims, 3 Drawing Sheets

OTHER PUBLICATIONS

Sschmidt, Henrik et al, "Physics of 3–D scattering from rippled seabeds and buried targets in shallow water", J. Acoust. Soc. Am. 105 (3), 1999.

Smith, Eric, "Measurement and localization of interface wave reflections from a buried target", J. Acoust. Soc. Am. 103 (5), Pt. 1, May 1998, pp. 2333–2343.

Younis, Waheed A. et al, "Nondestructive imaging of shallow buried objects using acoustic computed tomography", J. Acoust. Soc. Am. 111 (5), Pt.1, May 2002, pp. 2117–2127.

Frazier, Catherine H. et al, "Acoustic imaging of objects buried in soil", J. Acoust. Soc. Am. 108 (1), Jul. 2000, pp. 147–156.

Powers, Jeffrey E. et al, "Ultrasound Phased Array Delay Lines Based on Quadrature Sampling Techniques", IEE Trans. On Sonics & Ultrasonics, vol. SU–27(6), pp. 287–294, Nov. 1980.

Donskoy, Dimitri et al, "Nonlinear seismo–acoustic land mine detection and discrimination", J. Acoust. Soc. Am. 111 (6), Jun. 2002, pp/ 2705–2714.

* cited by examiner

CO-REGISTERED ACOUSTICAL AND OPTICAL CAMERAS FOR UNDERWATER IMAGING

This application claims the benefit of U.S. Provisional Application No. 60/322,725, filed Sep. 17, 2001.

TECHNICAL FIELD OF THE INVENTION

This invention relates to underwater imaging systems, and more particularly to multi-camera, co-registered fields of view, underwater imaging systems for stationary or underwater vehicle applications.

BACKGROUND OF THE INVENTION

Underwater operations are usually done by divers in shallow water, however, in deeper water or when hazardous conditions exist, it is common to use underwater vehicles. A remotely-operated vehicle (ROV), tethered to a surface vessel for operation by a human is the most widely used in commercial endeavors. Recently, for oceanographic and naval purposes, the unmanned, untethered, underwater vehicle (UUV) has been developed. In these vehicles, autonomous operation is required and the invention can play a key role in automated object identification.

Investigation of underwater wrecks, lost objects, pipelines, cables, unexploded ordnance, sea mines and other objects of interest can be a challenging problem depending on water clarity. In low or moderate turbidity water, optical cameras, particularly electro-optical cameras, can provide high-resolution images of such underwater objects. Water turbidity, however, can be a serious limitation to optical imaging, especially in littoral waters or when the sea floor is stirred up by the vehicle.

Acoustical cameras operating in the low MHz frequency range can image in very turbid water, producing 3D acoustical images, which may augment or substitute for the optical images. Other operations that could be undertaken by an ROV or UUV equipped with the invention include object recovery, connection to in-situ equipment, hull searches, and bottom surveys along piers or other mooring areas in addition to the U.S. Navy's interest in mine neutralization.

Underwater imaging is a highly developed technology. There are optical methods such as conventional cameras with floodlights or strobe (flash) lighting, such as described in D. J. Harris, "Eyes Under the Sea" in *Underwater Imaging*, Proc. SPIE, Vol. 980, pp. 53–56, 1988. There are range-gated, intensified, electro-optical cameras such as described in L. H. Gilligan et al, "Range gated underwater viewing" in *Underwater Imaging*, Proc. SPIE, Vol. 980, pp. 36–40, 1988. And there are laser lines scanners such as described in B. W. Coles, "Recent Developments in Underwater Laser scanning Systems" in *Underwater Imaging*, Proc. SPIE, Vol. 980, pp. 42–52, 1988.

There are also acoustical methods such as described in E. O. Belcher et al, "Acoustic, Near-video-quality Images for Work in Turbid Water" in *Proc. Underwater Intervention 2000 Conference*, Houston, Tex., January 2000, and acoustical cameras such as BAE SYSTEMS Acoustical Camera as described in T. E. White et al, "Imaging with an Underwater Acoustical Camera", in *Information Systems for Navy Divers and Autonomous Underwater Vehicles Operating in Very shallow Water and Surf Zone Regions*, Proc. SPIE Vol. 3711, 1999.

SUMMARY OF THE INVENTION

The invention is an underwater, multi-mode, imaging and target recognition system with different imaging devices having overlapping fields of view so that the images from each device can be compared and combined for improved pattern recognition. Among the combination of imaging modes contemplated are an acoustical camera and a real-time, range-gated, intensified, electro-optical camera having substantially overlapping fields of view for co-registered imaging of underwater objects at close ranges. The system may be mounted in an unmanned underwater vehicle but may be used in other fixed or mobile configurations. The coupled fields of view may be steerable in an arc around at least one axis over a large field of regard with a servo-controlled rotating mirror system, while the vehicle or platform, and/or the target, is moving or hovering. An on board or remote computer capability with an automated target recognition capability may use the multi-modality images to provide enhanced target recognition and/or autonomous operation in unmanned missions.

DESCRIPTION OF THE PREFERRED EMBODIMENT

Figure 1:
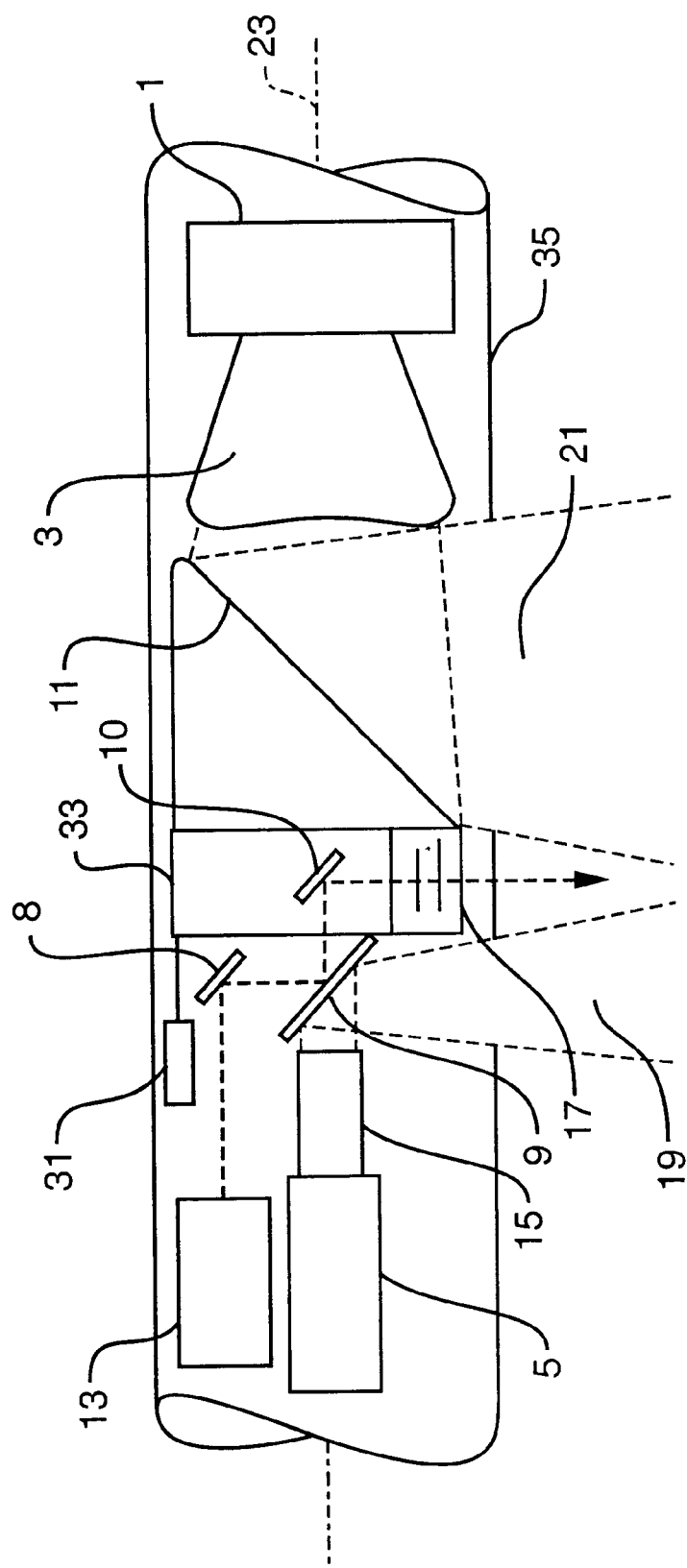
FIG. 1 is a diagrammatic side view of co-registered acoustical and electro-optical cameras mounted in an unmanned, underwater vehicle in accordance with the invention.

Referring to FIG. 1, in a preferred embodiment, an acoustical camera [1], such as the BAE SYSTEMS SonoCam™, and an electro-optical camera [5], such as to Xybion Electronic Systems Corp. Model ISG-250 are used for imaging. Both cameras are oriented on the long axis of rotation [23] of an unmanned underwater vehicle (UUV), directed towards each other. The telephoto lens [15] for electro-optical camera [5] and the acoustical lens [3] for acoustical camera [1] are chosen to provide similar fields-of-view [19] and [21] respectively. In this preferred embodiment, optical mirror [9] and acoustical mirror [11] are positioned at approximately 45 degrees to fold the fields of view (FOV) at right angles, out of hull [35] of the unmanned underwater vehicle (UUV) in a closely adjacent, approximately parallel relationship.

In this embodiment, mirrors [9] and [11] are rigidly connected through rotor [33] in order to aim the two cameras at the same object with their respective fields of view (FOV) [19] and [21]. Thus, the optical and acoustical images are inherently co-registered in almost perfect alignment.

Rotor [33] and servomotor system [31] are used to rotate the co-registered mirrors about axis of rotation [23], which is ideally the roll-axis of the UUV. The rotor contains acoustical transducer [17] that may be operated as a transmitter for insonifying the object for the acoustical camera or may be used as a traditional sonar transducer to aid in target acquisition. Pulsed laser illuminator [13] and mirrors [8] and [10] are mounted for rotation with rotor [33] for pulse alignment and use with intensified, range-gated, electro-optical camera [5].

Figure 2:
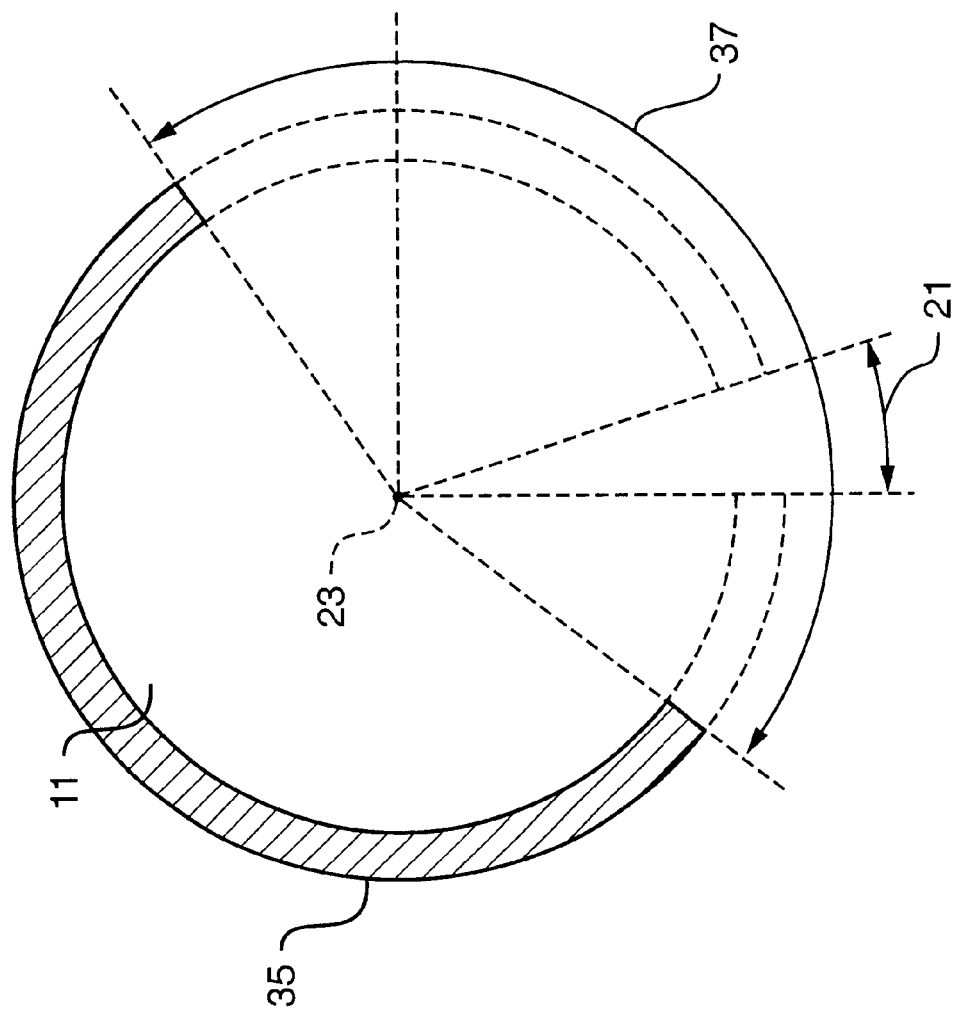
FIG. 2 is a cross section view of the mirror and rotor section of the embodiment of FIG. 1, showing the fields of view of the cameras within the larger field of regard of the system.

Referring now to FIG. 2, an axial or longitudinal cross section view of the system of FIG. 1, further illustrates the rotating mirror aspect of the invention and this preferred embodiment. Acoustical mirror [11] enables the axially mounted acoustical camera of FIG. 1 to image through the side of the vehicle hull [35]. In this embodiment, the acoustical FOV [21] angle was selected to be 14 degrees. By rotating the mirror about axis of rotation [23], any image direction within the field-of-regard (FOR) [37] may be selected. This degree of freedom in directing the FOV for image selection is particularly important when imaging from a moving vehicle or in turbulent water. The mirror [11] may be rapidly moved compared to the maneuvering capability of the vehicle. It may also be used with gyroscopic sensors and suitable controls to help stabilize the image by compensating for vehicle roll motion.

Of course, the angular size of the field of view may be larger or smaller than in this embodiment. It may be as small as the acceptable minimum field of view angle. It may be as large as 360 degrees by using a revolving yoke extending from the system structure behind the acoustical mirror to support the acoustical camera. The same principle may be extended to the optical end support, so that the system may be configured for a full 360 degree arc or field of regard.

The three dimensional (3D) acoustical images and the optical images have different characteristics. For autonomous operation, automated target recognition using the distinctive features of both the acoustical and optical images will yield a much higher probability of identification than either system alone. In extremely turbid water, automated target recognition will rely exclusively on the acoustical image.

Ultrasonic underwater cameras such as the BAE SYSTEMS SonoCam™ can be used without light. The Sono-Cam™ camera [1] is a 3 MHz ultrasonic underwater camera originally intended for use by Navy divers in clandestine operations without using light. It operates either monostatically (in a pulse-echo mode) or bistatically (with separate transmitter) to produce three dimensional image data from 5 to 16 feet range, at 15 frames per second. The seven inch diameter acoustical lens [3] forms an image on a fully-populated, 128×128 array (16,384 channels) of piezocomposite, acoustical transducer elements. It is the acoustical equivalent of a video camera, using ultrasound instead of light.

The Xybion Model ISG-250 electro-optical camera [5] is a commercial-off-the-shelf (COTS) electro-optical camera with an optical intensifier and may be range-gated to an eight nanosecond exposure time. The BAE SYSTEMS' pulsed laser [13] light source is a modified military laser such as used in the U.S. military's SNIPER laser system. No claim is made to trademarks.

Table 1 provides typical performance parameters of the two cameras and laser illuminator. With the pulsed laser [13] and range-gated camera [5] of the preferred embodiment, light backscattered from the water outside the target region may be excluded, greatly improving image quality.

Both cameras typically produce images at 15 frames/sec in the preferred embodiment, assuring rapid target acquisition, while relaxing the requirements on the UUV's navigation and guidance system.

TABLE 1

Characteristics of the Two Cameras of the Preferred Embodiment

| CAPABILITY | PERFORMANCE |
|---|---|
| Acoustical Camera [1] | |
| Frequency | 3 MHz (0.5 millimeter wavelength) |
| Range | >16 ft |
| Resolution | ½ in. @ 13 ft. |
| Field of View (FOV) | 14 degrees (3 ft × 3 ft @ 13 ft. range) |
| Pixel Count | 128 × 128 (16,384 simultaneous channels) |
| Imaging rate | 15 frames/sec |
| Range-Gated Intensified Optical Camera [5] | |
| Optical Source: Doubled Nd:YAG Pulsed Laser [13] | InGaAs Diode pumped |
| Wavelength | 530 nanometers |
| Pulse length | 5 nsec ($5 \times 10^{-9}$) |
| Pulse energy | >100 mJoule |
| Pulse repetition rate | 15 Hz/triggerable |
| Input Power | 100 Watts |
| Electro-optical camera [5] Range-gated Intensified CCD | |
| Gate length | 8 nsec Full Width Half-Maximum (≅3 ft volume in water) |
| Pixel matrix | 756 Horizontal × 484 Vertical |
| Resolution | 0.1 inches @ 13 ft. |
| Image Rate | 30 Hz frame, frame grabber enabled |
| Field of View | 20 degrees (4.5 ft × 4.5 ft @ 13 ft range) |
| Range | >15 ft. (in moderately turbid water) |

Note that these FOV, FOR, frame rates, and related parameters are only examples and may be changed in this or other embodiments by those familiar with such cameras; for example, through the choice of lenses or by using different cameras, without departing from the spirit and scope of the invention.

Other methods of acoustical image formation such as electronic beamforming using acoustical arrays may be employed within the scope of the invention.

Finally, other methods of producing co-registered acoustical and optical images, such as separate mirrors or separate camera mounts that are independently moved by coordinated control electronics are also within the purview of this invention.

Figure 3:
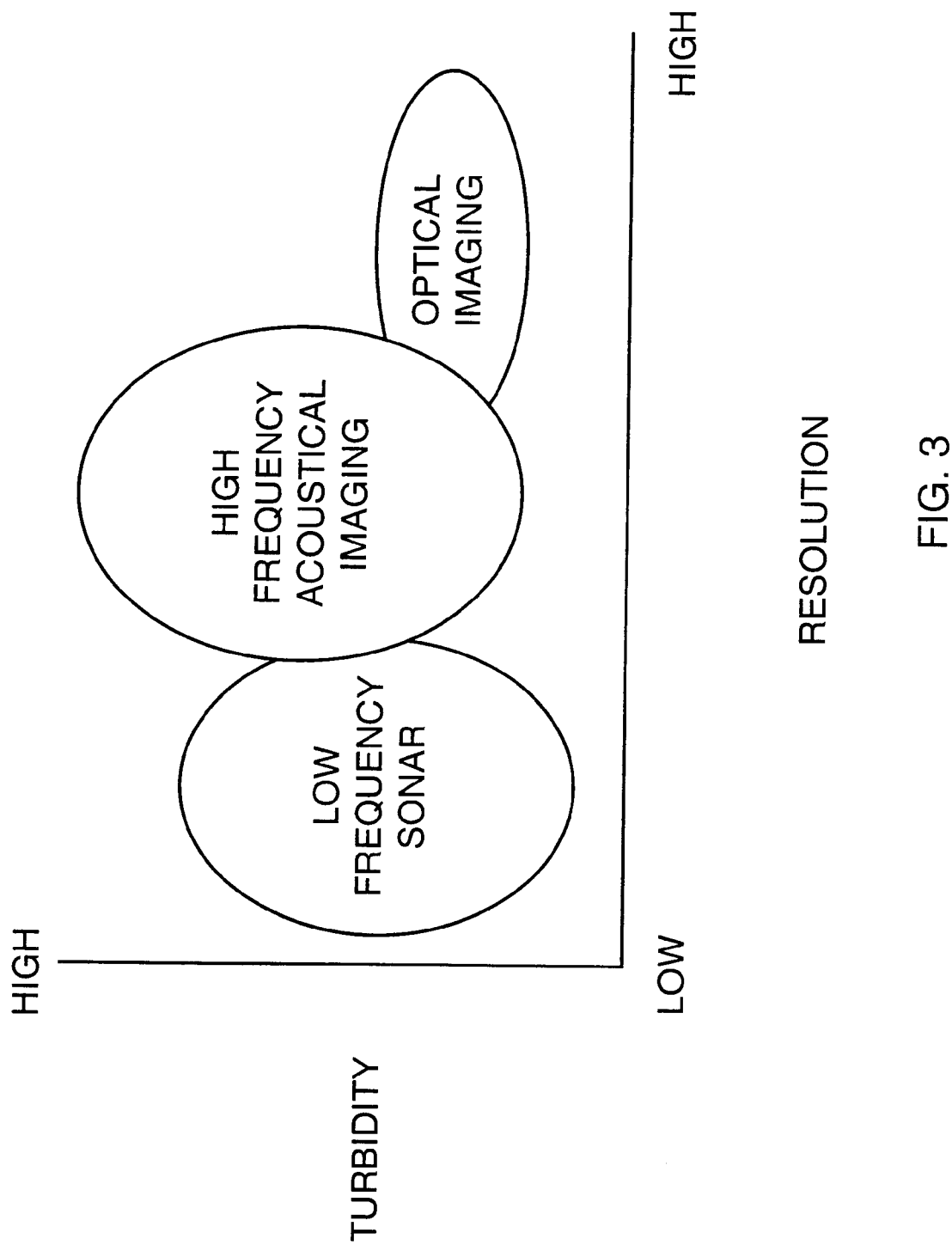
FIG. 3 is a graph illustrating the comparative characteristics of high frequency acoustical imaging to traditional sonar and optical imaging.

Referring to FIG. 3, it is useful to compare the methodology of the invention in other respects and to other approaches. For example, for operation in turbid littoral waters, the acoustical camera provides high-resolution images even in highly turbid littoral waters, unlike laser line scanners or other optical systems, which may not provide any useful images. With respect to resolution, the high, 3 MHz operating frequency results in a good sonar cross-section even against mines that have low-observability characteristics at lower frequencies. The real-aperture passive beam-former acoustical camera [1] produces 3D images at a rapid rate, without requiring the data collection latency of a synthetic aperture system or the power consumption of a digital processor.

Furthermore, the invention provides relaxed maneuvering requirements for the vehicle. Unlike side-looking sonar, no vehicle motion is required for imaging, greatly simplifying the vehicle control requirements for high-resolution imaging. The high-resolution images may also be acquired while the vehicle is hovering near the target. The servo system may also be used to compensate for any roll of the vehicle through feedback from the inertial navigation system, relaxing requirements on vehicle attitude control. This is a very simple system approach that supports close-range, 10 to 15 feet, object identification from small underwater vehicles. In addition, significant for clandestine operations, the high, 3

MHz transmitted pulse from the acoustical camera attenuates very rapidly with distance, reducing the ability to detect the presence of the vehicle or system from a distance.

The bi-modal, co-registered imaging system of the invention can be useful in other underwater configurations as well. For example, it may be used in a manned vehicle, in a surface vehicle in water of suitable depth, or in a stationary fixture on the seabed observing a fixed field of regard for targets moving through the field, or it may be carried by a rotating or robotic arm of a vehicle or a stationary fixture on the seabed so as to cover an extended area with respect to its host location. The single axis rotational capability of the preferred embodiment can be further modified to include an orthogonal, limited range of motion of coupled mirrors [9] and [11], controlled by a servo system for added image stability for a less than stable platform or for orthogonally increased field of regard. Yet further, the system may be yoke mounted within a vehicle of sufficiently large hull size or on a mounting platform in a manner orthogonal to its camera and rotor axis, so as to provide a two axis range of motion and a two dimensional or omni dimensional field of regard.

The preferred embodiment is not exhaustive of the scope of the invention or the claims. There are other and numerous embodiments and aspects of the invention, all within the scope of the appended claims. For example, there is an underwater imaging system consisting of an underwater platform upon which are mounted at least two cameras of unlike three dimensional imaging modes, where the cameras are configured with adjacent, outwardly directed fields of view, and the fields of view are substantially overlapping within the common effective range of the cameras, providing at least two types of three dimensional data of the target zone for evaluation and target recognition or other uses. There is provided means such as a servo-motor for directing the fields of view within the full or available field of regard. And there is a host computer for comparing the images from the cameras.

The first of the two cameras may be an acoustical imaging camera and an acoustical source. The second of the two cameras may be an optical camera and an optical illuminator source. The field of regard may be an axis of rotation defining an arc through which the fields of view may be rotated. The acoustical imaging camera and the acoustical source may operate at a frequency above 100 kHz acoustical imaging frequency.

The acoustical imaging camera may have a two-dimensional acoustical array for sending acoustical signals to the field of view and for receiving acoustical signals from the field of view, and in combination with the host computer be thereby able to generate three-dimensional images. The acoustical source may be a separate acoustical transducer, and the acoustical imaging camera may have an acoustical lens with which acoustical images are formed, or electronic beamforming means.

The optical camera may have an electro-optical image detector or an optical image intensifier. The electro-optical image detector may be range-gated. The optical illuminator source may be a pulsed flash lamp or laser. The means for directing the fields of view may use a servomotor system connected to the host computer, and may further include acoustical and optical mirrors that are steerable by the servomotor system.

The field of regard may be a two dimensional field, and the means for directing the fields of view within the field of regard may be two orthogonal axis of rotation defining respective orthogonal arcs through which the fields of view may be rotated. One of the axis of rotation may be substantially aligned with the roll axis of the water-borne vehicle, with the means for directing the field of view being connected to a navigation system of the underwater vehicle to compensate for roll motion of the vehicle to maintain the field of view in a desired direction. The underwater platform for the system may be a water-borne vehicle, either free floating, towed or self-propelled, but it may be a stationary underwater platform of some sort.

As another basic example of the invention, there is a three dimensional underwater imaging system consisting of an acoustical imaging camera and an acoustical source and an optical camera and an optical illuminator source, with respective fields of view of the cameras being substantially overlapping within the common effective range of the cameras, and a host computer for comparing and evaluating the images from the cameras to pattern information in a database.

As yet another example of the invention, there is an apparatus for underwater imaging consisting of a high frequency acoustical camera and acoustical energy source and a range-gated electro-optical camera and pulsed laser light source, where the cameras have substantially common fields of view through rigidly connected respective mirrors driven by a servomotor system such that the cameras and sources image a substantially common field of regard. The acoustical camera may contain an acoustical array and an acoustical lens for generating images.

Alternatively, the acoustical camera may contain an acoustical array and electronic beamforming means for generating images. The cameras, sources and servomotor system may all be mounted in an underwater vehicle. Further, the servomotor system may be electronically connected to the navigation system of the underwater vehicle to compensate for motion of the vehicle, including in particular the roll motion, to maintain the field of view in a desired direction.

Other and various examples within the scope of the invention and the appended claims will be apparent to those skilled in the art, from the description and the figures attached.

I claim:

1. An underwater imaging system comprising:
    an underwater platform upon which are mounted;
    at least two cameras of unlike imaging modes configured with adjacent, outwardly directed fields of view, said fields of view being substantially overlapping within the common effective range of said cameras;
    a rotation system for directing said fields of view over a field of regard, the field of regard having an axis of rotation defining an arc through which said fields of view may be rotated; and
    a host computer for comparing the images from said cameras.

2. The underwater imaging system of claim 1, a first of said two cameras comprising an acoustical imaging camera and an acoustical source, a second of said two cameras comprising an optical camera and an optical illuminator source.

3. The underwater imaging system of claim 2 wherein said acoustical imaging camera and said acoustical source operate at a frequency above 100 kHz acoustical imaging frequency.

4. The underwater imaging system of claim 3 said acoustical imaging camera comprising a two-dimensional acoustical array for sending acoustical signals to said field of view and receiving acoustical signals from said field of view, thereby generating three-dimensional images.

5. The underwater imaging system of claim 2, wherein said acoustical source is a separate acoustical transducer.

6. The underwater imaging system of claim 2, said acoustical imaging camera further comprising an acoustical lens with which acoustical images are formed.

7. The underwater imaging system of claim 2, said acoustical camera comprising electronic beamforming means.

8. The underwater imaging system of claim 2, wherein said optical camera comprises an electro-optical image detector.

9. The underwater imaging system of claim 8, wherein said electro-optical image detector is range-gated.

10. The underwater imaging system of claim 2, wherein said optical camera contains an optical image intensifier.

11. The underwater imaging system of claim 2, wherein said optical illuminator source is a pulsed flash lamp.

12. The underwater imaging system of claim 2, wherein said optical illumninator source is a pulsed laser.

13. The underwater imaging system of claim 1, wherein said rotation system for directing comprises a servomotor system.

14. The underwater imaging system of claim 1, wherein said rotation system further comprises acoustical and optical minors steerable by a common servomotor system.

15. The underwater imaging system of claim 1, said field of regard comprising a two dimensional range, said rotation system for directing said fields of view comprising two axes of at least limited rotation defining two orthogonal arcs through which said fields of view may be rotated.

16. The underwater imaging system of claim 1, said underwater platform comprising one of a water-borne vehicle or a stationary underwater platform.

17. The underwater imaging system of claim 1, said axis of rotation being substantially aligned with a roll axis of an underwater vehicle, said rotation system being connected to a navigation system of said underwater vehicle to compensate for roll motion of said vehicle to maintain said field of view in a desired direction.

18. An underwater imaging system comprising:
a three dimensional acoustical imaging camera and an acoustical source and an optical camera and an optical illuminator source, respective fields of view of said cameras being substantially overlapping within effective range of said cameras thereby enabling co-registered imaging of underwater objects; and
a rotation system for directing said fields of view over a field of regard, the field of regard having an axis of rotation defining an arc through which said fields of view may be rotated.

19. An underwater imaging system of claim 18, further comprising a host computer for comparing images from said cameras to pattern information in a database, thereby identifying targets in said images.

20. The underwater imaging system of claim 18, wherein said rotation system further comprises acoustical and optical mirrors steerable by a common servomotor system.

21. An apparatus for underwater imaging comprising:
a high frequency acoustical camera and acoustical energy source; and
a range-gated electro-optical camera and pulsed laser light source;
wherein said cameras have substantially common fields of view through rigidly connected respective mirrors driven by a servomotor system such that said cameras and said sources are capable of imaging a substantially common field of regard underwater.

22. An apparatus for underwater imaging according to claim 21, wherein said acoustical camera contains an acoustical array and an acoustical lens for generating images.

23. An apparatus for underwater imaging according to claim 21, wherein said acoustical camera contains an acoustical array and electronic beamforming means for generating images.

24. An apparatus for underwater imaging according to claim 21, wherein said cameras, said sources and said servomotor system arc mounted in an underwater vehicle.

25. An apparatus for underwater imaging according to claim 24, wherein said servomotor system is electronically connected to the navigation system of said underwater vehicle to compensate for motion of said vehicle to maintain said field of view in a desired direction.

* * * * *